Patented May 9, 1933

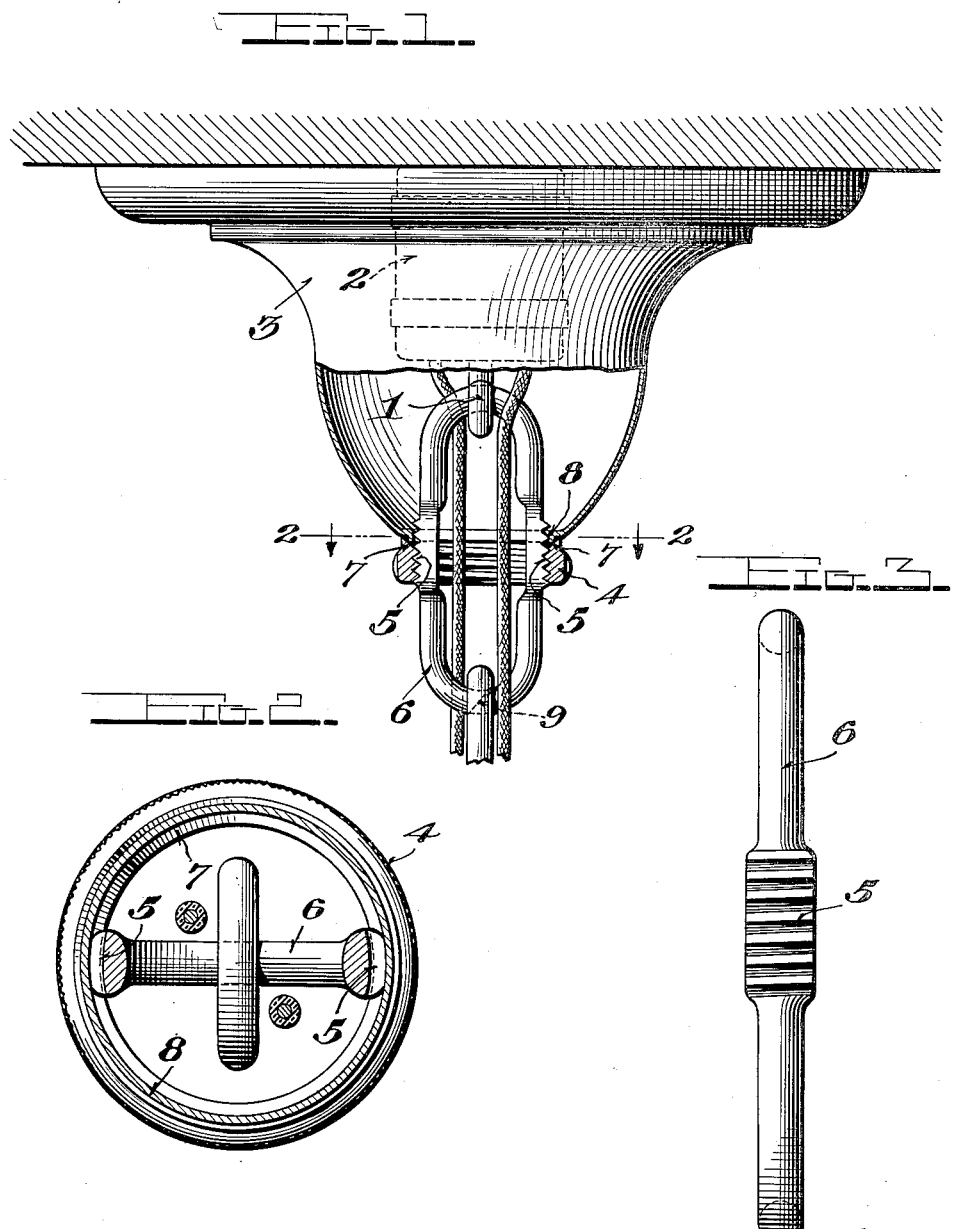

1,908,588

UNITED STATES PATENT OFFICE

HENRY D'OLIER, JR., OF BRIDGEPORT, CONNECTICUT

CEILING CANOPY SUPPORT

Application filed May 17, 1929. Serial No. 363,901.

This invention relates to ceiling canopy supports and the primary object thereof is to provide novel and improved means for supporting the canopy firmly against the ceiling and more particularly to support the canopy directly from the suspension chain or other suspending means of the lighting fixture.

The invention further aims to provide a support of this type which is of simple and economical construction, and which can be easily and quickly manipulated or operated in securing and removing the canopy.

In the drawing:—

Fig. 1 is a side elevation of the invention, partly broken away and in section;

Fig. 2 is a section on line 2—2 of Fig. 1, and

Fig. 3 is a detail view of the link in side elevation.

In proceeding in accordance with the present invention, a suitable hook 1 is employed which is secured to the ceiling, and which has a separable connector with plugging contacts between the sections, associated therewith and is designated 2. A chain is shown in fragment for supporting or suspending the lighting fixture, the latter not being shown, while the usual canopy 3 abuts the ceiling at its top, and is engaged at its bottom by a circular or other shaped nut or ring 4, the nut being threaded over threaded portions 5 formed on the external surfaces of the opposed sides of one of the links 6 of the chain. In this regard it will be noted that the threaded link 6 is disposed at such predetermined distance from the ceiling as to bring its nut 4 against the bottom edge of the canopy when the parts are in operative position.

The nut is of a diameter so as to freely slide out of engagement with the link 6 when it is turned out of engagement with the threads of the link, the threads of the link accordingly projecting outwardly beyond the sides of the link for the stated purpose.

Obviously the nut can be turned to regulate the degree of engagement of the canopy with the ceiling and thus obtain the desired fixed securement of the canopy with respect to the ceiling. Preferably the inner circumference of the nut at the top thereof has a circular bevelled portion 7 wherein is engaged a downturned flange 8 of circular form on the bottom edge of the canopy, thus holding such edge of the canopy against spreading or from becoming distorted when the nut is driven thereagainst.

From the foregoing it will be seen that a simple holding of the canopy in position is had with the present invention and one which can be easily and quick manipulated and at the same time regulable holding of the canopy against the ceiling obtained.

A convenient way for the wires supplying current to the lamps of the fixture is provided about the link and through the nut.

The threaded link may be formed of a single piece and unwelded at one of its ends as shown at 9 in dotted lines in Figure 1. This end may be readily sprung open by the operator and caused to receive or engage a link of chain, and upon seating the nut in the thread of the link the abutting ends will thereby be prevented from spreading, thus providing a safe and secure support for the depending fixture.

What is claimed is:—

1. A ceiling canopy support, including an outlet box, a fixture carrying chain, a hook to engage an end of the chain in the box, one of the links of the chain having its opposed sides formed with threads, a canopy engaged at its top with the ceiling and having a circular downwardly extending flange on its bottom, and a collar threaded on the said threaded sides of said link and having an outwardly and upwardly beveled circular inner circumferential portion receiving said flange of the canopy to hold the latter against the ceiling.

2. A ceiling canopy support, including an outlet box, a fixture carrying chain, a hook to engage an end of the chain in the box, one of the links of the chain having its opposed sides formed with threads, a canopy engaged at its top with the ceiling and a nut threaded on said threaded sides of said link and engaged with the bottom of the canopy to hold the latter against the ceiling.

In testimony whereof I affix my signature.

HENRY D'OLIER, JR.